US012580845B2

(12) United States Patent (10) Patent No.: US 12,580,845 B2
Ramasamy Subramanian et al. (45) Date of Patent: Mar. 17, 2026

(54) SYSTEMS AND METHODS FOR MANAGING MULTI-PATH NETWORK TRAFFIC

(71) Applicant: MICROSOFT TECHNOLOGY LICENSING, LLC, Redmond, WA (US)

(72) Inventors: Saravanan Ramasamy Subramanian, Bothell, WA (US); Sukanta Sarkar, Redmond, WA (US); Wagner Ferreira Mota Da Silva, Monroe, WA (US); Luis Irun-Briz, Sammamish, WA (US); Nikish Bhat, Bellevue, WA (US); Somesh Chaturmohta, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 425 days.

(21) Appl. No.: 18/140,971

(22) Filed: Apr. 28, 2023

(65) Prior Publication Data

US 2024/0364621 A1 Oct. 31, 2024

(51) Int. Cl.
| | |
|---|---|
| *H04L 45/24* | (2022.01) |
| *H04L 12/46* | (2006.01) |
| *H04L 45/00* | (2022.01) |
| *H04W 40/02* | (2009.01) |

(52) U.S. Cl.
CPC .......... *H04L 45/24* (2013.01); *H04L 12/4641* (2013.01); *H04L 45/22* (2013.01); *H04W 40/02* (2013.01)

(58) Field of Classification Search
None
See application file for complete search history.

(56) References Cited

U.S. PATENT DOCUMENTS

| | | |
|---|---|---|
| 2011/0032865 A1 | 2/2011 | Richardson |
| 2012/0218936 A1 | 8/2012 | Fleeman et al. |
| 2013/0163600 A1 | 6/2013 | Aguilar et al. |
| 2020/0213225 A1 | 7/2020 | Han |
| 2021/0314059 A1 | 10/2021 | Dankberg |
| 2022/0394014 A1 | 12/2022 | Wang |

(Continued)

FOREIGN PATENT DOCUMENTS

EP 1052812 A2 * 11/2000 ............. H04L 45/00

OTHER PUBLICATIONS

International Search Report and Written Opinion received for PCT Application No. PCT/US2024/023488, Jul. 26, 2024, 15 pages.

(Continued)

*Primary Examiner* — Christine T Duong
(74) *Attorney, Agent, or Firm* — Workman Nydegger

(57) ABSTRACT

Virtual connections are established between remotely connected servers in a network. The virtual connections include (1) a terrestrial path, as well as (2) a satellite path, for routing the flow of packets through the network. Keys are used for controlling the selective routing of packets through the virtual connections with either the terrestrial path and/or the satellite path. Some tenants in the network are provided virtual connections for enabling their use of the satellite paths and corresponding satellite components. Other tenants are only provided access to terrestrial connections and are restricted from utilizing the referenced satellite components.

20 Claims, 8 Drawing Sheets

(56)     References Cited

U.S. PATENT DOCUMENTS

2024/0283581 A1 *   8/2024   Eberlein   ............ H04L 27/2602

OTHER PUBLICATIONS

"Cisco IP VSAT Satellite WAN Network Module for the Cisco Integrated Services Routers", Published in Data Sheet of Cisco Systems, Mar. 13, 2015, pp. 1-9.
"Network Backup for Business Continuity", Retrieved From: https://x2n.com/solutions/network-backup-business-continuity/, Retrieved On: Mar. 21, 2023, 13 Pages.
Sokolowsky, Jennifer, "Azure Space Partners bring Deep Expertise to New Venture", Retrieved From: https://news.microsoft.com/source/features/digital-transformation/azure-space-partners-bring-deep-expertise-to-new-venture/, Oct. 20, 2020, 7 Pages.
International Preliminary Report on Patentability (Chapter I), received for PCT Application No. PCT/US2024/023488, mailed on Nov. 6, 2025, 10 pages.

* cited by examiner

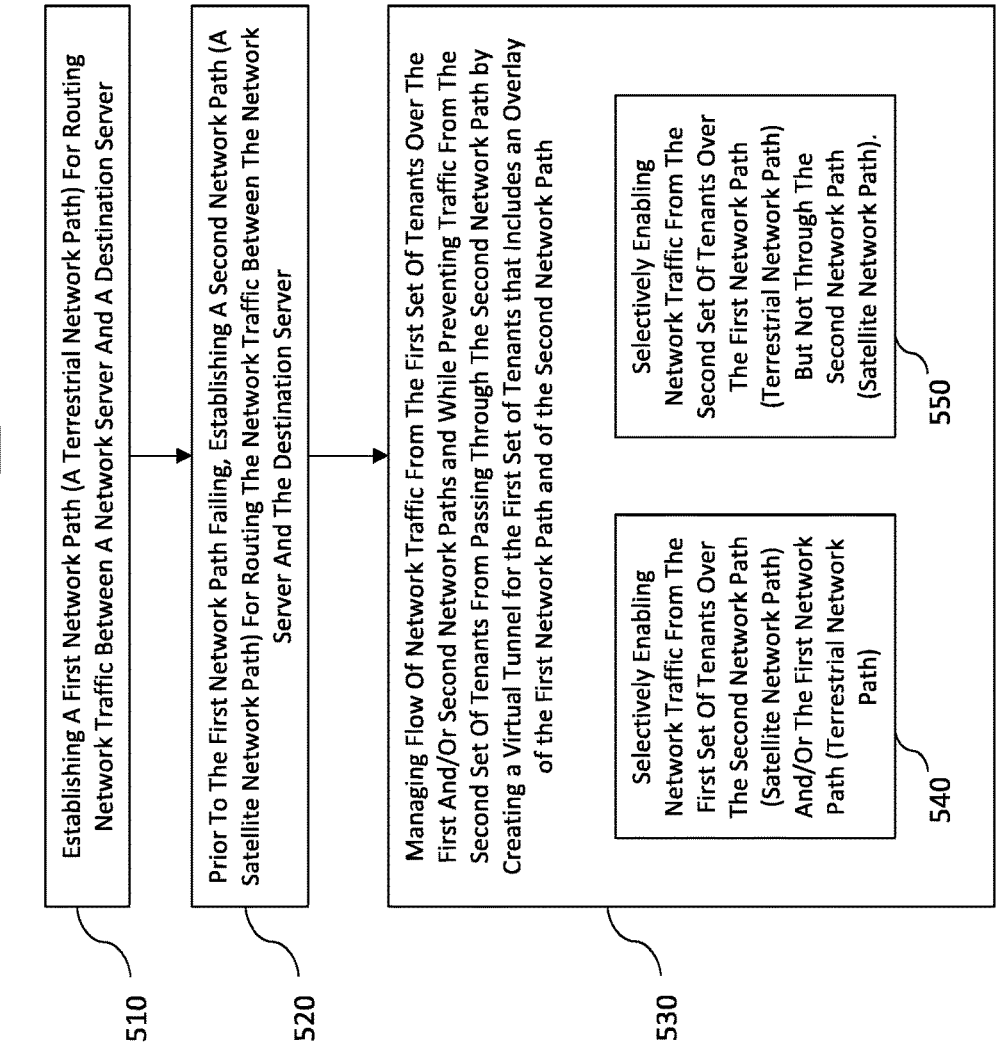

500

Establishing A First Network Path (A Terrestrial Network Path) For Routing Network Traffic Between A Network Server And A Destination Server

510

Prior To The First Network Path Failing, Establishing A Second Network Path (A Satellite Network Path) For Routing The Network Traffic Between The Network Server And The Destination Server

520

Managing Flow Of Network Traffic From The First Set Of Tenants Over The First And/Or Second Network Paths and While Preventing Traffic From The Second Set Of Tenants From Passing Through The Second Network Path by Creating a Virtual Tunnel for the First Set of Tenants that Includes an Overlay of the First Network Path and of the Second Network Path Selectively Enabling Network Traffic From The First Set Of Tenants Over The Second Network Path (Satellite Network Path) And/Or The First Network Path (Terrestrial Network Path)

540

Selectively Enabling Network Traffic From The Second Set Of Tenants Over The First Network Path (Terrestrial Network Path) But Not Through The Second Network Path (Satellite Network Path).

SYSTEMS AND METHODS FOR MANAGING MULTI-PATH NETWORK TRAFFIC

BACKGROUND

There are many types of networks, including terrestrial networks and satellite networks. There are also hybrid networks that incorporate different combinations of terrestrial and satellite network communication links. Each of these networks is associated with different benefits and costs.

Terrestrial networks are generally less expensive to utilize than satellite networks. However, terrestrial network communications are often less reliable than satellite network communications. For example, terrestrial networks are typically more susceptible to bandwidth constraints and hardware failures than satellite networks. Terrestrial networks are also more restricted in terms of geographic coverage.

Some signals propagated by satellites may not be as strong as their terrestrial counterparts. However, satellite communications are still typically considered more reliable than terrestrial communications, particularly during inclement weather, as satellite communication frequencies are carefully selected to overcome the negative effects of the ionosphere (e.g., absorption by gases and water vapor). Satellite communications are also more easily scaled than terrestrial communications.

The type of network that is best for any particular entity may change over time. For instance, the needs of a company may change to accommodate dynamic fluctuations in customer locations, bandwidth requirements, quality of service agreements, etc. Dynamic conditions like weather and hardware failures can also affect the utility of a network at any given time.

For at least these reasons, there is a tremendous interest in identifying and developing new techniques and systems for managing network communications and, particularly, for providing reliable network connectivity when a network experiences dynamic conditions that can negatively affect network communications.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include methods and systems for managing network traffic and, even more particularly, for establishing virtual connections that include terrestrial and satellite network paths for routing the flow of packets through a network.

In some embodiments, network traffic for tenants is transmitted between a network server (e.g., a customer or tenant-facing server) and a destination server (e.g., a remote data center) through virtual tunnels, such as a VxLAN (virtual extensive LAN) multi-point tunnel which creates an overlay over the structural components of terrestrial and satellite networks. A different virtual tunnel can be created for each tenant's workload. The virtual tunnel may include, for example, an overlay for both (1) a first network path comprising a terrestrial network component (e.g., a Wide Area Network (WAN) connection or component) between the network server and the destination server, as well as for (2) a second network path omitting the terrestrial network connection but, instead, comprising a satellite network connection between the network server and the destination server.

In some embodiments, the first network path is susceptible to a first type of network failure (e.g., a line being cut or another failure), while the second network path is not susceptible to the same failure, and the second network path is established before the first network path failing due to that first type of network failure occurring. The second network path is also operable with or without the first network path failing.

A virtual tunnel created for a tenant workload is managed, in some instances, with the use of a virtual network identifier (VNI), which can be used to advertise the destination workload for the tenant and which can be included with routing information for the data packets that are being transmitted through the virtual tunnel.

In some instances, routers and other network components at the server(s) use the VNI to selectively route network traffic containing predetermined VNIs through the second network path (satellite path), rather than the first network path (terrestrial path), while preventing network traffic for other customers/tenants that do not include the predetermined VNIs from utilizing the satellite network connection(s) of the second network path.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 5 illustrates an example of a flowchart having acts associated with methods for managing network traffic through virtual tunnels that include both terrestrial and satellite network paths.

DETAILED DESCRIPTION

Figure 1:
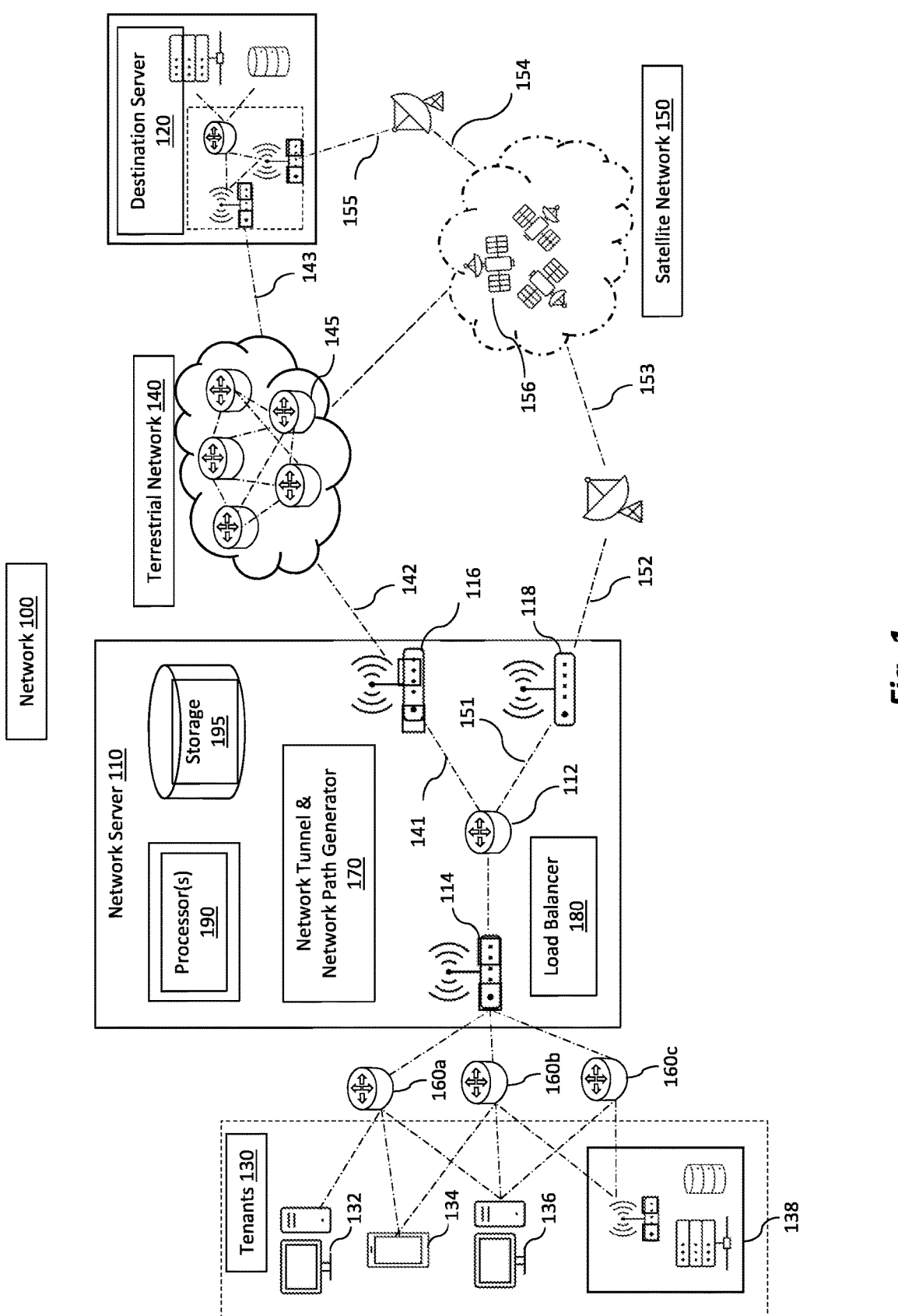
FIG. 1 illustrates an example of a network that includes a network server in communication with a destination server and in which tenants can transmit data between the network server system and the destination server through various terrestrial and/or satellite network paths.

As previously noted, the disclosed embodiments include methods and systems for managing network traffic and, even more particularly, for establishing virtual connections that include both terrestrial and satellite network paths and for selectively routing the flow of packets through the virtual connections.

The disclosed embodiments provide many technical benefits over conventional hybrid network configurations that utilize terrestrial network links with backup satellite network links. In particular, conventional hybrid network configurations that utilize backup satellite links are only configured to use the satellite links if the primary terrestrial network fails. This all-or-nothing approach is fairly inflexible and does not enable a tenant on that system to establish a connection through the satellite infrastructure unless a failure occurs on the terrestrial network. This can be problematic because of the latency experienced while the system verifies the failure occurred and instantiates a new connection through the satellite infrastructure for the tenant. This latency can be particularly problematic when the tenant is engaging in a live event and the delay experienced while instantiating the new connection is very noticeable, even when the content is being buffered.

Additionally, when a customer desires a certain quality of service that is typically enabled through a conventional hybrid system's terrestrial network and satellite network, that system will not trigger the creation of a new connection for the customer through the satellite network when the terrestrial network intermittently experiences quality degradations that do not qualify as complete failures, such as may be a result of fluctuations in network bandwidth or minor weather distributions. While these types of fluctuations are acceptable for many customers, they are not acceptable for others. Unfortunately, conventional hybrid networks that only utilize satellite networks as backups for completely failed terrestrial networks are not able to accommodate the needs of many customers.

The disclosed embodiments provide increased flexibility and decreased latency for using satellite network connections, particularly when compared to the conventional hybrid systems that use satellite networks as backups. In particular, the disclosed systems create virtual tunnels for tenant workloads that enable the selective use of satellite network paths, as well as terrestrial network paths. By creating virtual tunnels that include satellite network paths in addition to the terrestrial network paths, the disclosed systems can avoid latencies that would otherwise be incurred (as in conventional systems) by delaying the establishment of a new satellite connection until it is first determined that a terrestrial network has failed. While there may be some additional costs associated with the management of terrestrial and satellite networks concurrently, as required by the creation of the disclosed virtual tunnels, these costs are offset by the increased flexibility and reliability provided by the use of the virtual tunnels.

Attention is now directed to FIG. 1. In this illustration, a network 100 is provided that includes a network server 110 connected to a destination server 120 for facilitating communications between one or more tenants 130 and the destination server 120 over terrestrial network paths through a terrestrial network 140 and/or satellite network paths through a satellite network 150.

One example of a terrestrial network path includes the path segments shown by dashed lines 141, 142, and 143. This terrestrial network path may also include the terrestrial network 140, various terrestrial network hardware (e.g., router 145), and/or any other network components that do not overlap with the satellite network 150.

One example of a satellite network path includes the path segments shown by dashed lines 151, 152, 153, 154, and 155. This satellite network path may also include the satellite network 150, various satellite hardware (e.g., satellite 156), and/or any other network components that do not overlap with the terrestrial network 140.

The tenants 130 may comprise individual users, enterprises, groups of users, and/or their devices, having network accounts that enable the tenants 130 to access or utilize tenant workloads at the destination server and which include various data and services available at the destination server 120.

The destination server 120 is shown as a single localized entity. However, it will be appreciated that the destination server 120 may also comprise a distributed system that includes multiple disparate systems and gateways specific to customer workloads. In some instances, the destination server 120 is a data center that stores data and/or applications associated with the tenants 130.

A tenant interfaces with the stored data and applications at the destination server 120 with workloads by transmitting and receiving network packets corresponding to the workloads. The network packets are transmitted through network paths by the network server 110. The network server 110 discriminates which network path(s) are used for the different packets by advertising the workloads and packet routing information that is used by the routers of the network server (e.g., router 112) for routing the different packets over the different network paths and/or for filtering the network packets (e.g., preventing certain packets from passing through restricted network paths that those certain packets corresponding to unadvertised workloads are unable to pass through).

Tenants 130 interface with the network server 110 through various network connections interposed between the tenants 130 and the network server 110, including one more edge router associated with the tenant or network server networks (e.g., routers 160a, 160b, 160c).

The network server 110 also includes other routers (114, 116, 118) to interface with the tenant networks, as well as the terrestrial network 140 and satellite network 150. While specific router configurations are shown, it will be appreciated that the scope of the invention is not limited to any particular router configuration. Instead, the router configuration shown is merely an aid in helping to explain the concepts described herein.

During use, the network server 110 advertises the workloads or the workload destinations for the different tenants, such that the data packets being sent to the destination server 120 for any given workload can include the proper routing information, including the destination where the data or service for that workload is stored or provided at the destination server 120.

When the routers of the network server 110 handle a network packet, they can route that network packet to the destination server workload address specified with the network packet through any network path that is authorized for use with that destination server workload.

In the disclosed embodiments, the workload address specified with some network packets includes a VNI (virtual network identifier) that is recognized by the destination server 120 for providing access to a tenant workload corresponding to the VNI and which authorizes use for network traffic over the satellite network 150.

In some embodiments, each tenant workload corresponds to a unique/different VNI. The various VNIs can be advertised to the routers and other network path components through lists, indexes, routing tables, and/or other data structures to control and enable traffic of the network packets containing advertised routes associated with the VNIs over the satellite network 150 and/or through other network paths that are restricted to packets containing an advertised VNI.

During use, the network server 110 may use a network tunnel & network path generator 170 to assign, identify and/or advertise the routes associated with the VNI for a tenant workload to the network routers and other system and network components. This process effectively creates a virtual tunnel for the tenant workload between the network server 110 and the destination server 120. This virtual tunnel includes all paths that the data packets for that tenant workload is authorized to pass through. In this regard, the virtual tunnels created for workloads having established VNI destination addresses include both terrestrial network paths through the terrestrial network 140 and satellite network paths through the satellite network 150.

In contrast to the tenant workloads having virtual tunnels to traffic their network packets through various network paths, including through the satellite network 150, tenant workloads that are not associated with a VNI do not have a virtual tunnel created to traffic their packets through the satellite network 150 during normal operation. Notwithstanding the foregoing, it will be appreciated that during a failure of the terrestrial network 140, any tenant workloads that are not associated with the VNI virtual tunnels can be routed through new failover network connections that are established after the failure of the terrestrial network 140, and which may use portions of the satellite network 150, similar to how conventional hybrid systems failover. Notably, however, this is different than establishing an initial virtual tunnel with access to the satellite network 150 and the terrestrial network 140 from the very beginning, even prior to any detected failure event at the terrestrial network 140.

In some instances, a first set of one or more tenants are determined to have a subscription level or account type that grants them access to the satellite network 150. Once this determination is made, the workloads for that tenant are assigned VNIs that enable the data packets for those tenant's workloads to be transmitted through satellite network paths that include satellite components that do not overlap with network components of the terrestrial network 140 and that remain operable even when components of the terrestrial network 140 experience a failure of a first type (e.g., a discontinuity in signal, a hardware failure, a broken or cut line, restriction in bandwidth, degradation in the quality of service, etc.).

The network server also includes a load balancer or WAN optimizer (e.g., load balancer 180) that may be separate from and/or integrated with any of the routers of the network server. The load balancer 180 can be used to determine whether a particular network packet for a tenant workload associated with a VNI should be routed over the terrestrial network 140 or, alternatively, over the satellite network 150, of the created virtual tunnel. When the load balancer 180 includes or is replaced by a WAN optimizer, the WAN optimizer can also help with equal-cost multi-path (ECMP) distribution and routing of the packets across multiple-paths, thereby helping utilize the physical and satellite paths more efficiently. This can be beneficial, for example, when the terrestrial network 140 is operating at an optimized level that facilitates the transmission of data packets at a high quality of service and with desired reliability. In particular, the load balancer 180 can selectively route the flow of network packets for a tenant workload associated with a VNI through the terrestrial network 140 of the virtual tunnel, which may be less expensive than the satellite network 150, even though the workload is still enabled to also be routed through the satellite network 150 of the virtual tunnel.

Then, at any point, the system can re-direct the flow of the workload through the satellite network 150 of the virtual tunnel (e.g., in response to detecting or anticipating unfavorable conditions at the terrestrial network) without incurring any delay in having to establish a new connection through the satellite network 150, such as would otherwise be required by a conventional hybrid system when creating a brand new connection as part of failover mitigation.

With regard to the foregoing, the system may anticipate unfavorable conditions that may affect the operational performance of the terrestrial network 140, for example, based on scheduled maintenance, a time of day or season in which traffic over the terrestrial network 140 typically increases, etc.

It is also noted, as shown, that the network server 110 includes one or more hardware processor(s) 190 and software processors that are configured to execute stored code comprising computer-executable instructions for implementing the functionality described herein and which are stored in storage 195.

Attention is now directed to FIGS. 2A-2D. These illustrations show various scenarios in which the network may utilize the terrestrial and satellite network paths as part of a virtual tunnel created between the network server 110 and the destination server 120.

Figure 2A:
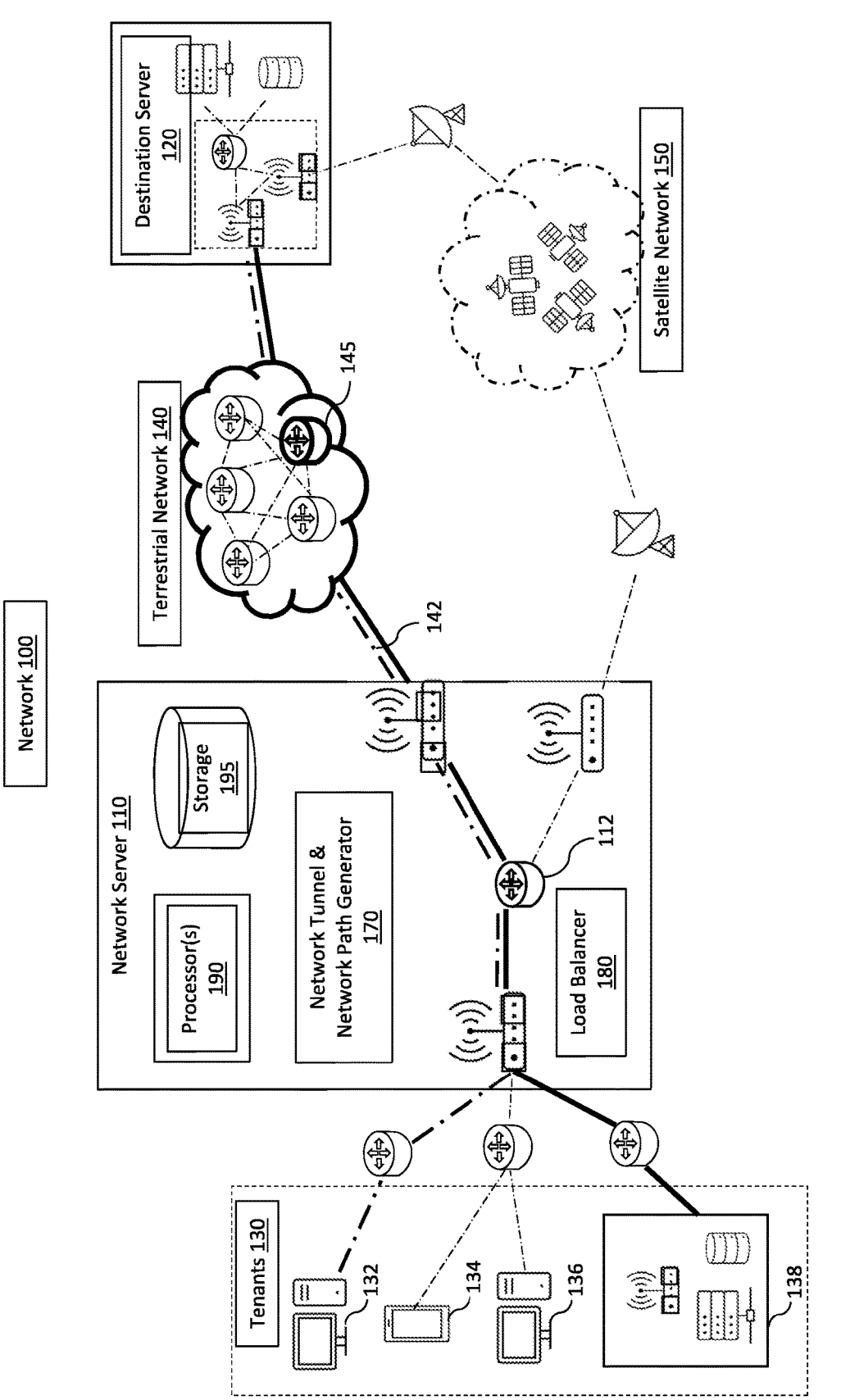
FIGS. 2A-2D illustrate examples of the network in FIG. 1 in which terrestrial network paths through a terrestrial network and satellite network paths through a satellite network are used to route network traffic for different tenants.

In FIG. 2A, various tenants (i.e., tenant 132, tenant 134, tenant 136, and tenant 138) are interfacing through network server 110 to access resources available at the destination server 120. In this scenario, tenant 138 is an enterprise system, and tenant 136 is a system of an individual user. Tenants 136 and 138 are included in a first set of tenants that have accounts or subscriptions that entitle tenant 136 and tenant 138 to premium services, such as to utilize network paths that traverse the satellite network 150, whereas a second set of tenants (e.g., tenants 132 and 134) may not have subscription levels or accounts that entitle them to the services that include the use of network paths that traverse the satellite network 150.

A tenant workload is created for tenant 138 to access resources at the destination server 120. Based on the account type of tenant 138, the tenant workload for tenant 138 is associated with a VNI during the creation of a virtual tunnel between network server 130 and destination server 120, as previously described.

When network packets associated with that tenant workload are transmitted, they can be transmitted through any path enabled through the virtual tunnel, as also described. In the illustration of FIG. 2A, network server 130 causes the selection and use of a terrestrial network path for the tenant workload, even though that virtual tunnel also enables passage through the satellite network path. This scenario may occur, for example, when the terrestrial network 140 is operating effectively and the system determines that it can transmit the packets for the workload of tenant 138 through the terrestrial network 140 at a desired or predetermined quality of service.

However, if a determination ever occurs that the system cannot transmit the packets for the workload of tenant 138 through the terrestrial network 140 at a desired or predetermined quality of service and/or there is a failure with the terrestrial network 140, then the system will redirect the flow of the network packets for that workload through the satellite network path that is already established as part of the virtual tunnel for that workload, and without having to create a new network connection for that workload. (See FIG. 2C). Such a change in the rerouting of the packets for the workload of tenant 138 may occur prior to any disruption of service, such as when there is just an anticipated disruption of service.

Figure 2B:
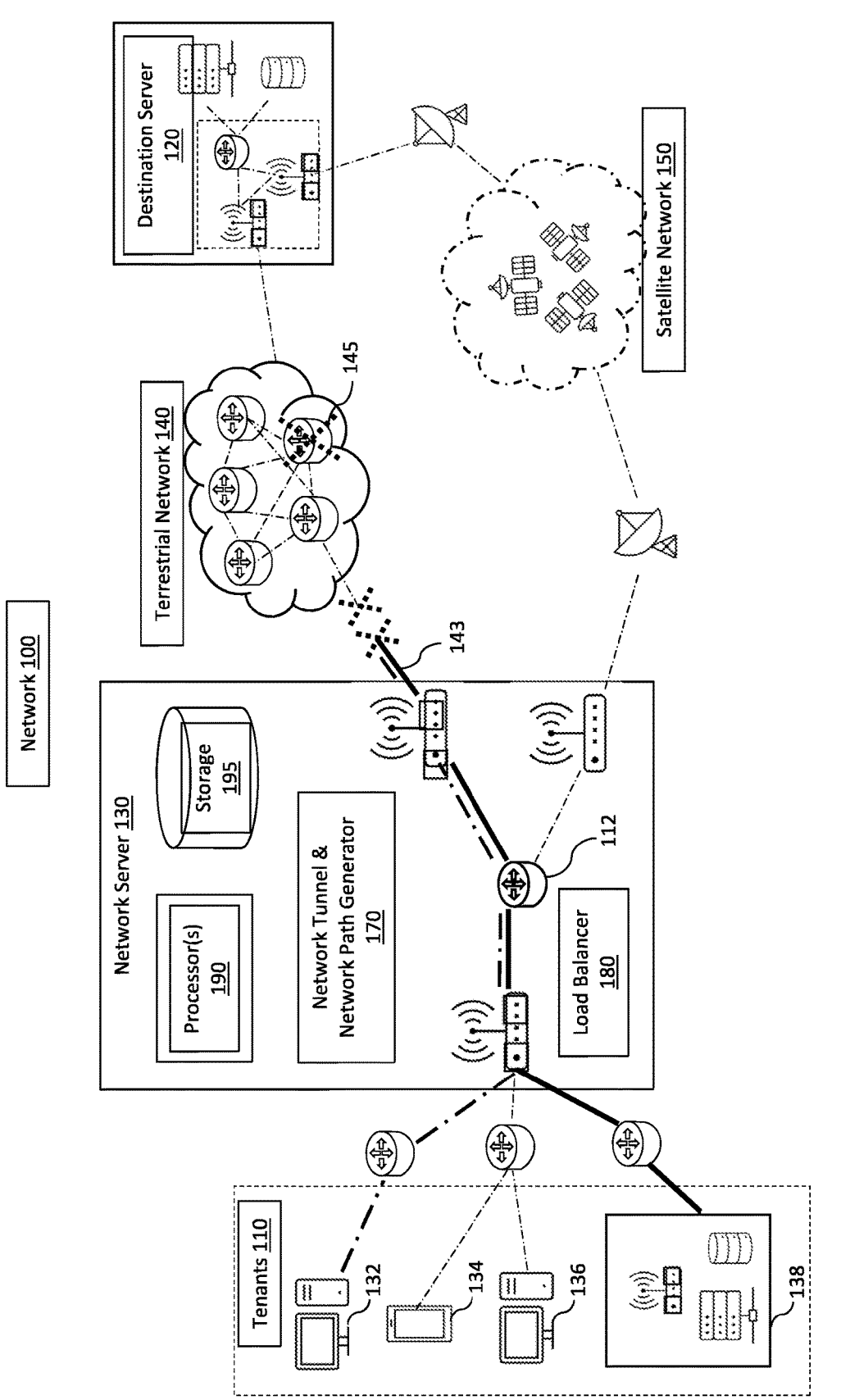
Figure 2C:
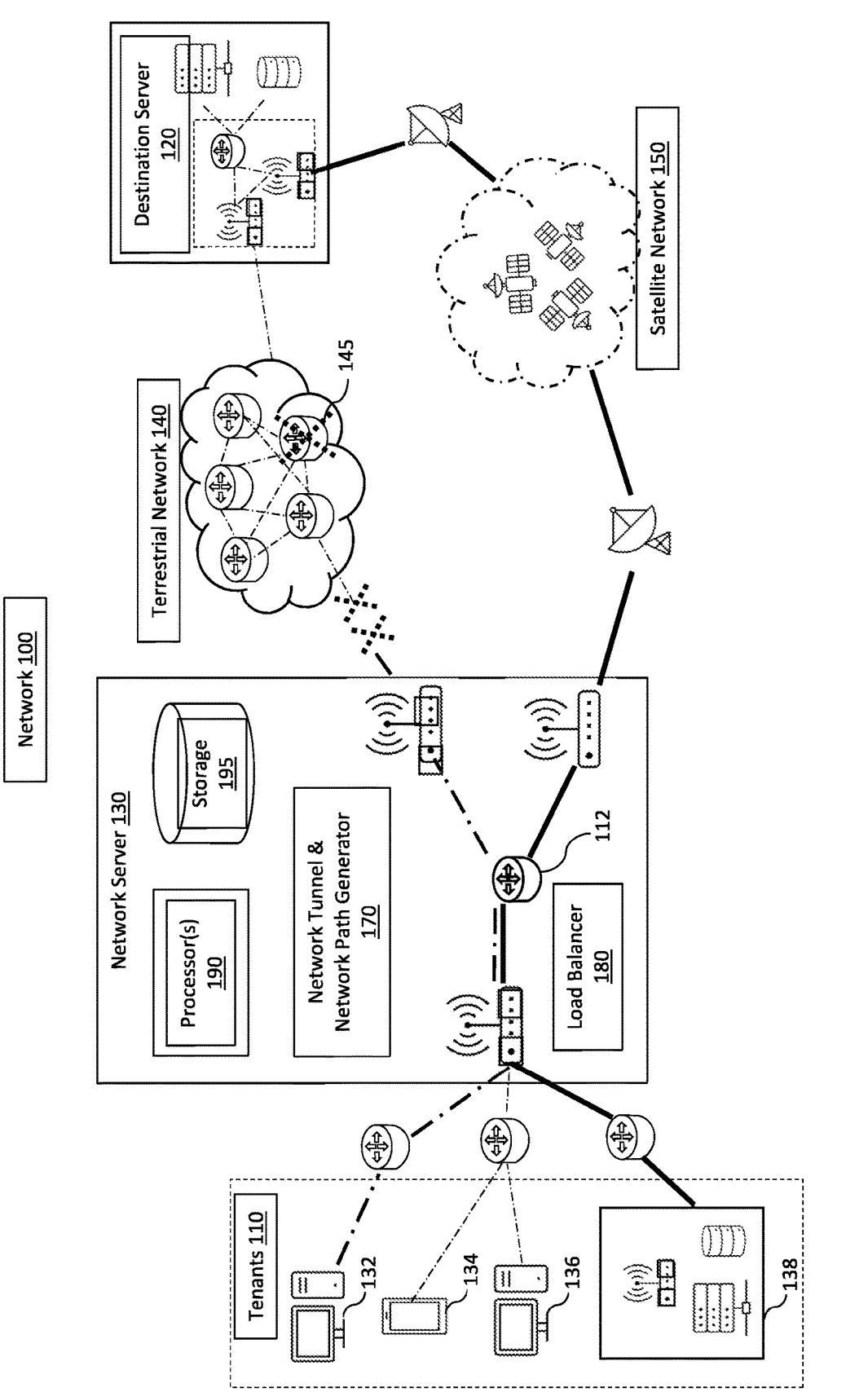

In contrast, network packets associated with a workload for tenant 132 are also being transmitted over the terrestrial network 140 in FIG. 2A. However, since a virtual tunnel for that workload is not already established with access through the satellite network 150, the system cannot simply redirect the packets for the workload of tenant 132 through the satellite network 150 in the event of a failure of the terrestrial network 140. (e.g., a cut in line 142 or a failure of a critical edge router (router 145), for example, as shown in FIGS. 2B-2C). Instead, the system will simply fail to transmit the packets for tenant 132, as shown.

Alternatively, to service tenant 132, the system will have to undergo a process of creating a new connection for tenant 132 through a different network, which may include satellite network 150. However, to create this new connection, the system will have to process the requisite handshakes, authentications, and other session initiation procedures that are required to establish the new connection, which is not required for simply redirecting traffic as it did for tenant 138 since the virtual tunnel for the workload of tenant 138 was already created to include the satellite network path.

Figure 2D:
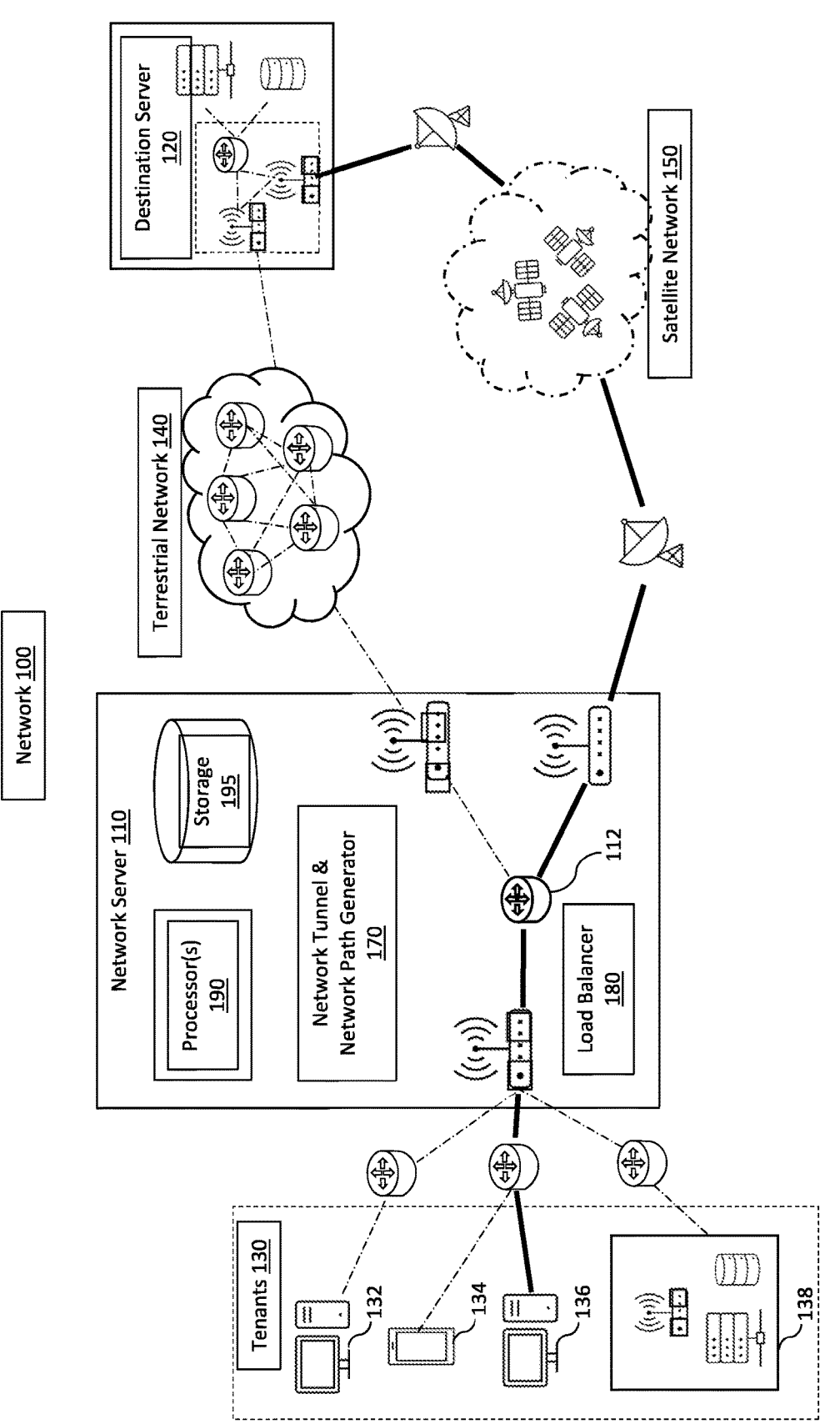

FIG. 2D illustrates yet another embodiment of the network 100. In this embodiment, tenant 136 initiates communication with network server 110 to access resources at destination server 120. As a result, the system creates a virtual tunnel or connection between the network server 110 and the destination server 120, which includes both an established satellite network path and an established terrestrial network path, for the tenant to access the requested resources at the destination server 120. Notably, the data packets for this tenant workload can be selectively transmitted through either the terrestrial network path, which includes terrestrial network 140, and/or through a satellite network path, which includes satellite network 150. The VNI for the tenant workload is advertised to router 112 and other routing components of the system that control which path the packets are directed through.

When router 112 sees a packet from tenant 136 for the workload that includes the VNI, router 112 can simply direct that packet through the satellite path, as shown.

Alternatively, as discussed with regard to FIG. 2A, the load balancer 180 may cause router 112 to route the packet through the terrestrial network path of the virtual tunnel, even though the satellite network path is also available based on favorable conditions detected for the terrestrial network 140. This may occur, for example, by setting a rule for router 112 to selectively route packets over the terrestrial or satellite network paths of the established virtual tunnel in response to the favorable conditions being detected (e.g., certain bandwidth availability or quality of service metrics detected for the terrestrial network 140).

Figure 3:
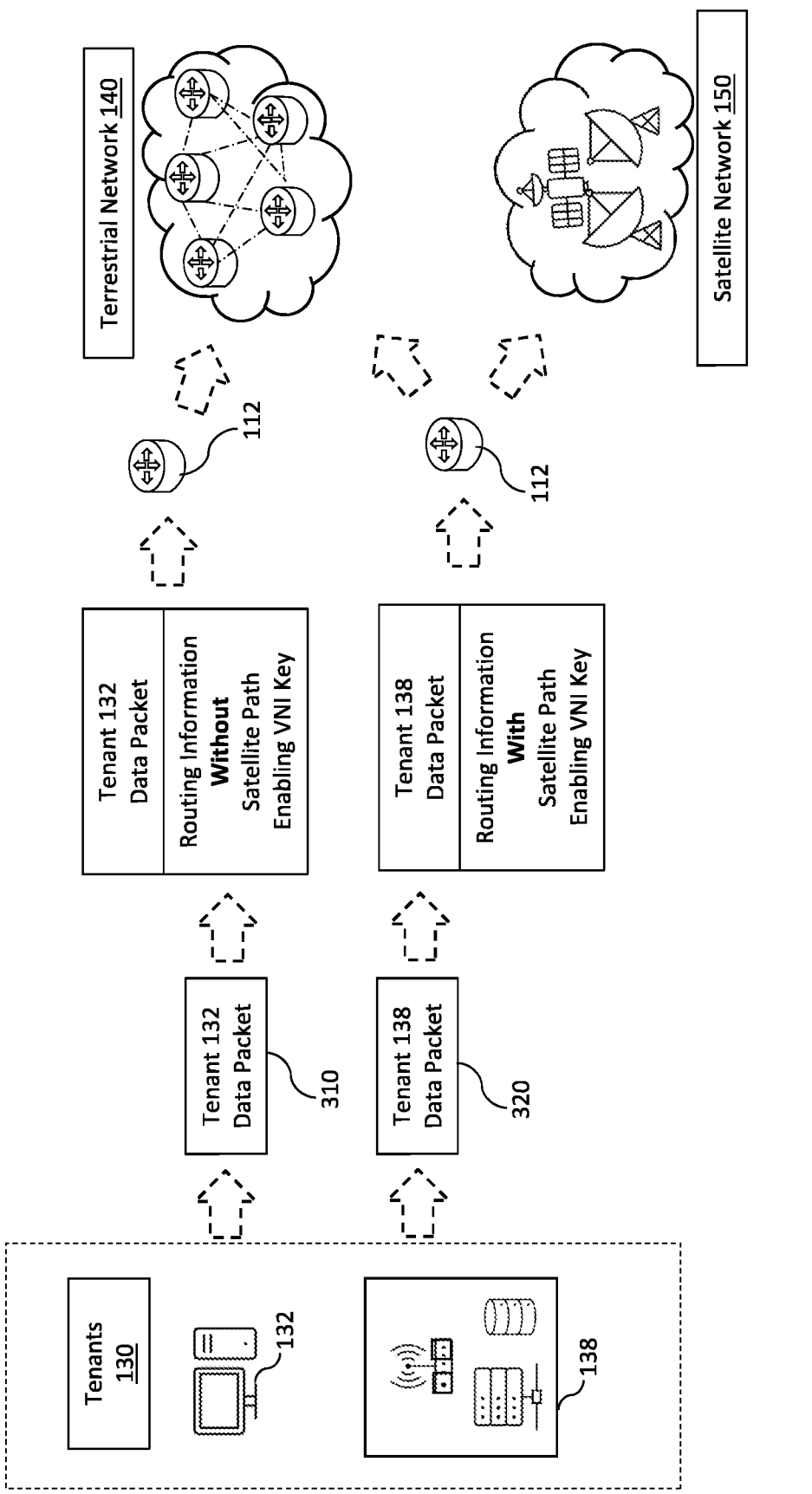
FIG. 3 illustrates an example of network traffic in the form of tenant data packets being routed through terrestrial and satellite network paths.

Attention is now directed to FIG. 3. This illustration shows how a tenant 132 data packet 310 is processed by the network server 110 with routing information that omits the satellite path enabling VNI key used during the creation of the virtual tunnels described above. In other words, a virtual tunnel with satellite network path access was not created for the tenant workload that this data packet 310 corresponds to. As a result, this network packet is routed, by default by router 112, through one or more terrestrial network paths passing through terrestrial network 140 based on the routing information.

FIG. 3 also shows how a tenant 138 data packet 320 is processed by the network server 110 with routing information that includes the satellite path enabling VNI key. In other words, a virtual tunnel with satellite network path access was created for the tenant workload that this data packet 320 corresponds to. As a result, this network packet is selectively routed by router 112 through a satellite network path and/or one or more terrestrial network paths included in the virtual tunnel associated with the VNI key.

Figure 4:
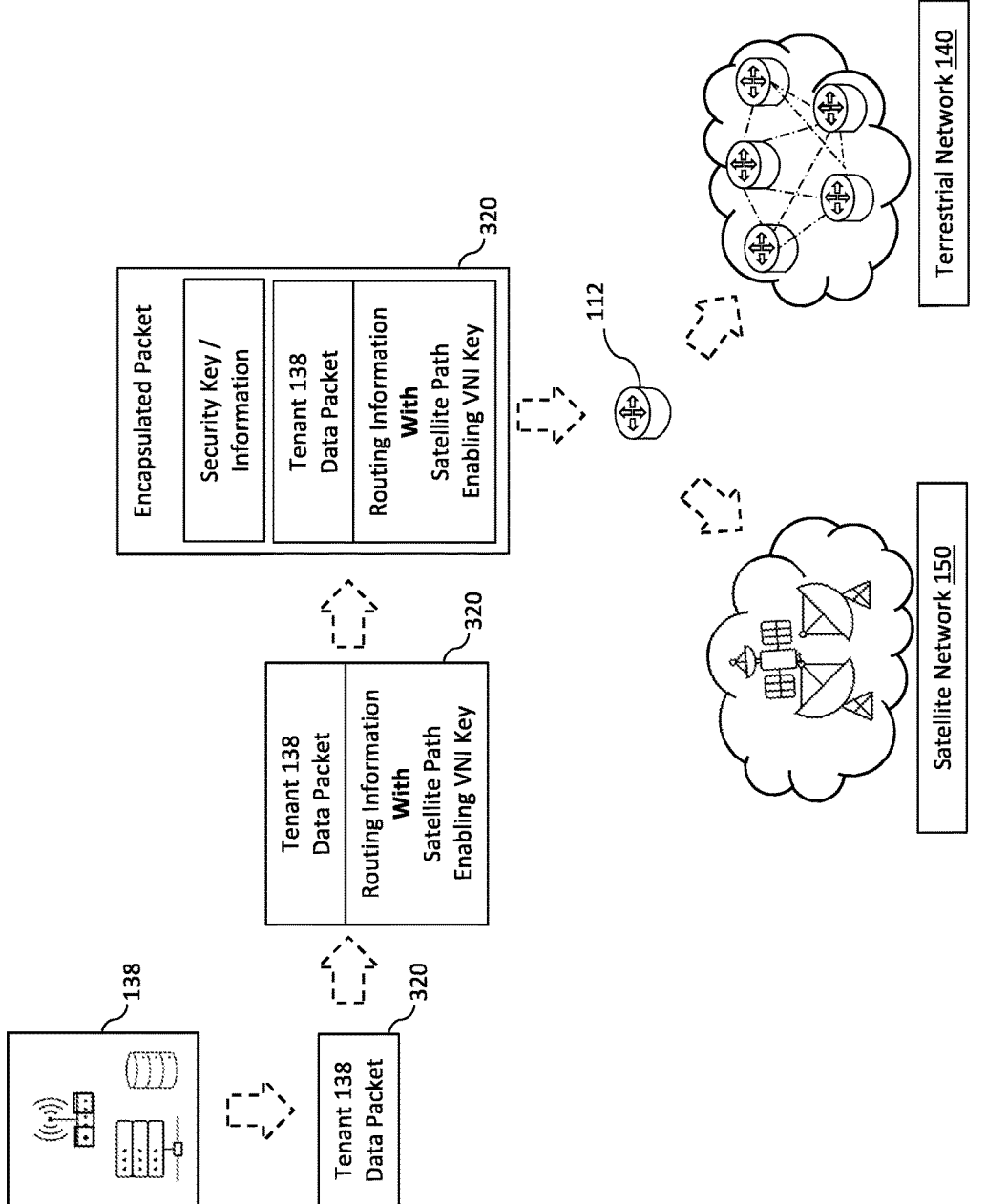
FIG. 4 illustrates an example of network traffic in the form of tenant data packets being routed through terrestrial and satellite network paths after being encapsulated with security information.

To help promote the security of the network packets, the virtual tunnel is preferably a VxLAN multi-point tunnel that is secured by encapsulating the header and payload corresponding with the VNI with a different destination address, security key, and/or other information that is routable to the destination server and that is decapsulated by the destination server to reveal the actual VNI destination workload address. This is shown, for example, in FIG. 4. Such embodiments provide additional security by preventing anyone who intercepts the encapsulated packet from being able to simply spoof the VNI key from the encapsulated packet or access the payload in the data packet.

Attention is now directed to FIG. 5, which illustrates a flow diagram 500 of a plurality of acts associated with example methods for managing network traffic with virtual tunnels that include network paths through terrestrial and satellite network components.

The illustrated acts are implemented by a computer system, such as network server 110, having a processor and storage that stores computer-executable instructions that are executable by the processor to implement the functionality of the referenced acts.

The first illustrated act includes establishing a first network path (a terrestrial network path) for routing network traffic between a network server and a destination server (act 510). Notably, this first network path comprises multiple terrestrial network connections or components that are each susceptible to a first type of network failure that components a satellite network path (a second network path) will not be susceptible to. These types of failures, for example, could include a terrestrial hardware component failure, a line being cut, a faulty edge router of the terrestrial network, an overloaded queue, or a lack of bandwidth, etc.

This first network path can be established by linking and interfacing all of the different network nodes or components within the first path together so that they can receive and hand off network packets that are routed to and through this network path between the network server and the destination server.

Additionally, at some point before the first network path fails (if it fails at all), the methods also include establishing the referenced second network path, which is a satellite network path that includes one or more hardware or software components (e.g., a satellite and satellite communication interfaces) that do not overlap with and are not included in the first and terrestrial network path (act 520). In some embodiments, the second network path remains operable even when the terrestrial network fails, such as due to one of the network failure types mentioned above.

This second network path can be established by linking and interfacing all of the different network nodes or components within the second path together so that they can receive and hand off network packets that are routed to and through this network path between the network server and the destination server.

The flow diagram 500 also includes an act of managing the flow of network traffic from the first set of tenants over the first network path (the terrestrial network path) and/or over the second network path (the satellite network path) (act 530). This act may broadly include the creation of the virtual tunnels, as mentioned previously, including the assignment of VNIs to different tenant workloads, as well as the filtering and/or routing of the network packets based on the VNIs over the different network paths. In this act, the system manages a flow of network traffic from a first set of tenants selectively over the first/terrestrial network path and/or the second/satellite network path, while also managing a flow of network traffic from a second set of tenants over only the first/terrestrial network path but not the second/satellite network path, and even while the first network path remains operable.

In some instances, a first set of tenants is associated with a subscription level that enables the creation of tenant workloads having the virtual multi-point tunnels mentioned above (with terrestrial and satellite network paths), while a second set of tenants is not associated with the subscription level that enables the creation of tenant workloads having the virtual multi-point tunnels having both terrestrial and satellite network paths.

As a result of this differentiation, the systems can manage the flow of network traffic (act 530) by performing corresponding sub-acts of (1) selectively enabling network traffic from the first set of tenants over the second/satellite network path and/or over the first/terrestrial network path (act 540), while also (2) selectively enabling network traffic from the second set of tenants over the first/terrestrial network path but not over the second/satellite network path (act 550), even though the first network path remains operational.

The foregoing control may be implemented by advertising the different VNIs for the virtual tunnels to the network routers and other network components that route traffic through the satellite network paths and by causing those routers and components to only let network traffic pass through the satellite network paths that include the VNIs that are advertised.

Despite the ordering illustrated in flow diagram 500, it will be appreciated that the illustrated acts can also be performed in different ordering. For instance, while flow diagram 500 shows act 520 occurring after act 510, these acts may occur concurrently, or act 520 may occur before act 510. Likewise, when the system may create the virtual tunnel for a tenant workload before establishing a particular network path that is to be used while managing the flow of network traffic, such that act 530 occurs prior to or concurrently with act 510 or 520.

What is important is that the routing components connected to and/or that are included with the network path(s) are able to route the network packets for the corresponding tenant workloads through the network paths once they are established. This means that the VNIs for the virtual tunnels and corresponding tenant workloads for the virtual tunnels will be advertised to the various edge routers and other network components of the network path that control flow through the network path(s), even if the satellite network path is established after the virtual tunnel and VNI destination address is created.

It will also be appreciated that the disclosed methods may include other acts as well, such as the encapsulating of a network packet containing a VNI destination address for a destination server with additional security and/or routing information so that the VNI is not discoverable if intercepted in route to the destination server.

It will be appreciated that the disclosed methods may be practiced by a computer system comprising one or more processors and computer-readable media such as computer memory. The computer memory may store computer-executable instructions that when executed by one or more processors cause various functions to be performed, such as the acts recited in the disclosed embodiments.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes RAM (random access memory), ROM (read-only memory), EEPROM (programmable read-only memory), CD-ROM (compact disk read-only memory), or other optical disk storage (such as CDs (compact disks), DVDs (digital video disks), etc.), magnetic disk storage or other magnetic storage devices, or any other hardware storage devices which can be used to store desired program code in the form of computer-executable instructions or data structures and which can be accessed by a general purpose or special purpose computer.

When information is transferred or provided over a network or another communications connection (either hardwired, wireless, or a combination of hardwired or wireless) to a computer, as described herein, the computer properly views the connection as a transmission medium. Transmission media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"—network interface card), and then eventually transferred to computer system RAM and/or less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FP-GAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing network traffic for tenants between a network server and a destination server, the method comprising:
establishing a first network path for routing network traffic between a network server system and a destination server, the first network path comprising a terrestrial network;
prior to the first network path failing, establishing a second network path for routing the network traffic between the network server system and the destination server, the second network path comprising a satellite network having network components that do not overlap with the terrestrial network; and
managing a flow of network traffic from a first set of tenants selectively over at least one of the first network path and the second network path while also managing a flow of network traffic from a second set of tenants over only the first network path, but not the second network path, and even while the first network path remains operable, wherein a workload for a tenant in the first set of tenants comprises a virtual network identifier (VNI) that is used when routing network packets for the workload through a virtual tunnel.

2. The method of claim 1, wherein the method further comprises selectively advertising destination workloads for the first set of tenants to routers of the network server system with routing information that enables the routers that receive packets from the first set of tenants to route the packets from the first set of tenants through the second network path as well as through the first network path.

3. The method of claim 1, wherein the method further comprises selectively advertising destination workloads for the second set of tenants to routing components without any routing information that enables the routers that receive packets from the second set of tenants to route the packets from the second set of tenants through the second network path, and such that the packets from the second set of tenants are only routed by the routers through the first network path and not through the second network path.

4. The method of claim 1, wherein the method further comprises creating the virtual tunnel for the workload for the tenant in the first set of tenants, the virtual tunnel including an overlay of the first network path and the second network path.

5. The method of claim 1, wherein the virtual tunnel comprises a VxLAN tunnel.

6. The method of claim 1, wherein the method further comprises encapsulating the VNI of the network workload.

7. The method of claim 1, wherein the method further comprises routing network packets from the first set of tenants through the second network path even though the first network path is operable.

8. The method of claim 1, wherein the method further comprises routing a first set of packets from the first set of tenants through second network path and a second set of packets from the first set of tenants through the first network path.

9. The method of claim 1, wherein the method further comprises redirecting a flow of the network traffic from the first set of tenants from the second network path to the first network path of the virtual tunnel that includes the first network path and the second network path without creating a new network connection between the network server and the destination server.

10. A method for managing network traffic for tenants between a network server and a destination server, the method comprising:
establishing a first network path for routing network traffic between a network server system and a destination server, the first network path comprising a terrestrial network;
prior to the first network path failing, establishing a second network path for routing the network traffic between the network server system and the destination server, the second network path comprising a satellite network having network components that do not overlap with the terrestrial network;
creating a virtual tunnel for a tenant workload that overlays both the first network path and the second network path and the tenant workload including a virtual network identifier (VNI) destination address; and
using the VNI to selectively route network packets associated with the tenant workload over the second network path while preventing network packets that omit the VNI from being routed through the second network path.

11. The method of claim 10, wherein the method further comprises:

managing a flow of network traffic from a first set of tenants, which includes a particular tenant having the tenant workload, selectively over one or more of the first network path and the second network path while also managing a flow of network traffic from a second set of tenants over only the first network path, but not the second network path, and even while the first network path remains operable.

12. The method of claim 11, wherein the method further comprises selectively advertising destination workloads for a first set of tenants to routers of the network server system with routing information that enables the routers that receive packets from the first set of tenants to route the packets from the first set of tenants through the second network path as well as through the first network path.

13. The method of claim 12, wherein the method further comprises selectively advertising destination workloads for the second set of tenants to the routers without any routing information that enables the routers that receive packets from the second set of tenants to route the packets from the second set of tenants through the second network path, and such that the packets from the second set of tenants are only routed by the routers through the first network path and not through the second network path.

14. The method of claim 13, wherein the VNI is a unique identifier that is different than VNIs for different tenant workloads.

15. The method of claim 13, wherein the virtual tunnel comprises a VxLAN tunnel.

16. The method of claim 15, wherein the method further comprises encapsulating the VNI with different routing information that routes to the destination server.

17. The method of claim 13, wherein the method further comprises routing network packets from the first set of tenants through the second network path even though the first network path is operable.

18. The method of claim 13, wherein the method further comprises routing a first set of packets from the first set of tenants through second network path and a second set of packets from the first set of tenants through the first network path.

19. The method of claim 13, wherein the method further comprises redirecting a flow of the network traffic from the first set of tenants from the second network path to the first network path of a virtual tunnel that includes the first network path and the second network path without creating a new network connection between the network server and the destination server.

20. A computer system that manages network traffic for tenants between a network server and a destination server, the computer system comprising:

one or more processors; and
    one or more hardware storage devices that store instructions that are executable by the one or more processors to cause the computer system to;
        establish a first network path for routing network traffic between a network server system and a destination server, the first network path comprising a terrestrial network;
        prior to the first network path failing, establish a second network path for routing the network traffic between the network server system and the destination server, the second network path comprising a satellite network having network components that do not overlap with the terrestrial network; and
        manage a flow of network traffic from a first set of tenants selectively over at least one of the first network path and the second network path while also managing a flow of network traffic from a second set of tenants over only the first network path, but not the second network path, and even while the first network path remains operable,
    wherein a workload for a tenant in the first set of tenants comprises a virtual network identifier (VNI) that is used when routing network packets for the workload through a virtual tunnel.

* * * * *